United States Patent
Grob et al.

(10) Patent No.: US 7,539,507 B2
(45) Date of Patent: May 26, 2009

(54) PEER-TO-PEER COMMUNICATIONS

(75) Inventors: Matthew S. Grob, La Jolla, CA (US);
Rashid A. Attar, San Diego, CA (US);
Henry D. Pfister, San Diego, CA (US);
Klein S. Gilhousen, Bozeman, MT (US); Ramin Rezaiifar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 10/954,846

(22) Filed: Sep. 29, 2004

(65) Prior Publication Data

US 2005/0111383 A1 May 26, 2005

Related U.S. Application Data

(60) Provisional application No. 60/523,989, filed on Nov. 21, 2003.

(51) Int. Cl.
*H04B 7/00* (2006.01)
*H04Q 7/20* (2006.01)

(52) U.S. Cl. ............... 455/522; 455/41.2; 455/444; 455/518; 455/519; 455/524; 370/338; 370/318

(58) Field of Classification Search .......... 455/522, 455/552.1, 101, 464, 450, 451, 455, 444, 455/462, 518, 516, 519, 524, 575.7; 370/342, 370/338, 346, 335, 318
See application file for complete search history.

(56) References Cited

U.S. PATENT DOCUMENTS

| 5,056,109 | A |   | 10/1991 | Gilhousen et al. |
| 5,117,458 | A |   | 5/1992 | Takaragi et al. |
| 5,396,516 | A |   | 3/1995 | Padovani et al. |
| 5,471,469 | A | * | 11/1995 | Flammer et al. ............ 370/346 |
| 5,544,223 | A |   | 8/1996 | Robbins et al. |
| 5,933,781 | A |   | 8/1999 | Willenegger et al. |
| 6,035,209 | A |   | 3/2000 | Tiedemann, Jr. et al. |
| 6,101,179 | A |   | 8/2000 | Soliman |
| 6,366,572 | B1 |  | 4/2002 | Esterberg et al. |
| 6,529,482 | B1 |  | 3/2003 | Lundby |
| 6,609,008 | B1 |  | 8/2003 | Whang et al. |
| 6,621,804 | B1 |  | 9/2003 | Holtzman et al. |
| 6,633,552 | B1 |  | 10/2003 | Ling et al. |
| 6,697,375 | B1 | * | 2/2004 | Meng ......................... 370/465 |

(Continued)

FOREIGN PATENT DOCUMENTS

EP        1083622      *  3/2001

(Continued)

OTHER PUBLICATIONS

European Search Report-EP07102167, Search Authority-Munich Patent Office-Apr. 11, 2007.

(Continued)

*Primary Examiner*—Sujatha Sharma
(74) *Attorney, Agent, or Firm*—Abdollah Katbalo; Kristine U. Ekwueme

(57) ABSTRACT

In a multiple-access network, network access terminals conduct peer-to-peer communications on reverse link channels of the network.

46 Claims, 11 Drawing Sheets

U.S. PATENT DOCUMENTS

| | | | |
|---|---|---|---|
| 6,748,234 B1 | 6/2004 | Agrawal et al. | |
| 2002/0164963 A1* | 11/2002 | Tehrani et al. | 455/101 |
| 2004/0047319 A1* | 3/2004 | Elg | 370/338 |
| 2005/0176455 A1* | 8/2005 | Krishnan et al. | 455/522 |
| 2005/0207384 A1* | 9/2005 | Quick et al. | 370/342 |
| 2006/0160563 A1* | 7/2006 | Ku | 455/552.1 |
| 2006/0267841 A1* | 11/2006 | Lee et al. | 342/463 |

FOREIGN PATENT DOCUMENTS

| | | |
|---|---|---|
| EP | 1788761 A1 | 5/2007 |
| WO | 97024818 | 7/1997 |
| WO | 03010982 | 2/2003 |

OTHER PUBLICATIONS

International Search Report PCT/US04/038817, International Search Authority-European Patent Office-Jul. 29, 2005.

Lott, et al.,: "Medium Access and Radio Resource Management for Ad Hoc Networks based on UTRA TDD" Proceedings of the 2nd ACM International Symposium on Mobile Ad Hoc Networking & Computing, Oct. 2001, pp. 76-86.

Meincke, et al.,: "Reservation Conflicts in a Novel Air Interface for Ad Hoc Networks Based on UTRA TDD", Vehicular Technology Conference, 2003. VTC 2003-Fall. 2003 IEEE 58th Orlando, FL, USA Oct. 6-9, 2003, pp. 2985-2989.

* cited by examiner

I - Interference power control
F - Finger lock power control
PTP - Power control from PTP participants

| Effective PTP PC Command | Effective BTS Mandatory Down PC Command | Effective BTS Finger Lock Up PC Command | Result |
|---|---|---|---|
| DOWN | DOWN | DOWN | DOWN |
| DOWN | DOWN | UP | N/A |
| DOWN | UP | DOWN | DOWN |
| DOWN | UP | UP | UP |
| UP | DOWN | DOWN | DOWN |
| UP | DOWN | UP | N/A |
| UP | UP | DOWN | UP |
| UP | UP | UP | UP |

FIG. 6

PEER-TO-PEER COMMUNICATIONS

BENEFIT UNDER 35 U.S.C. §119

The present Application for Patent claims priority to Provisional Application No. 60/523,989 entitled "PEER-TO-PEER COMMUNICATIONS" filed Nov. 21, 2003, and assigned to the assignee hereof and hereby expressly incorporated by reference herein.

BACKGROUND

1. Field

The present application relates to wireless communication and specifically to peer-to-peer communications among access terminals of a multiple-access network supporting in-coverage and out-of-coverage modes.

2. Background

Peer-to-peer communication involves a group of communication entities sharing some common characteristic, or set of characteristics, enabling initiation and communication with each other without the help of higher-level intermediaries.

Peer-to-peer communications may be used for Push-To-Talk (PTT) and other applications, such as Push-To-Media (PTM), (an extension of PTT for data) and extends to media transmissions, such as video.

With the adaptation of a multiple-access network to provide access terminals with peer-to-peer capability, in addition to point-to-point capability, there is a need for network power control to consider conditions such as the contribution of transmit power in peer-to-peer communications to the total interference experienced by the network.

BRIEF DESCRIPTION OF THE DRAWINGS

FIG. 6 is a table illustrating a power control mechanism at the access terminal level.

DETAILED DESCRIPTION

Figure 1:
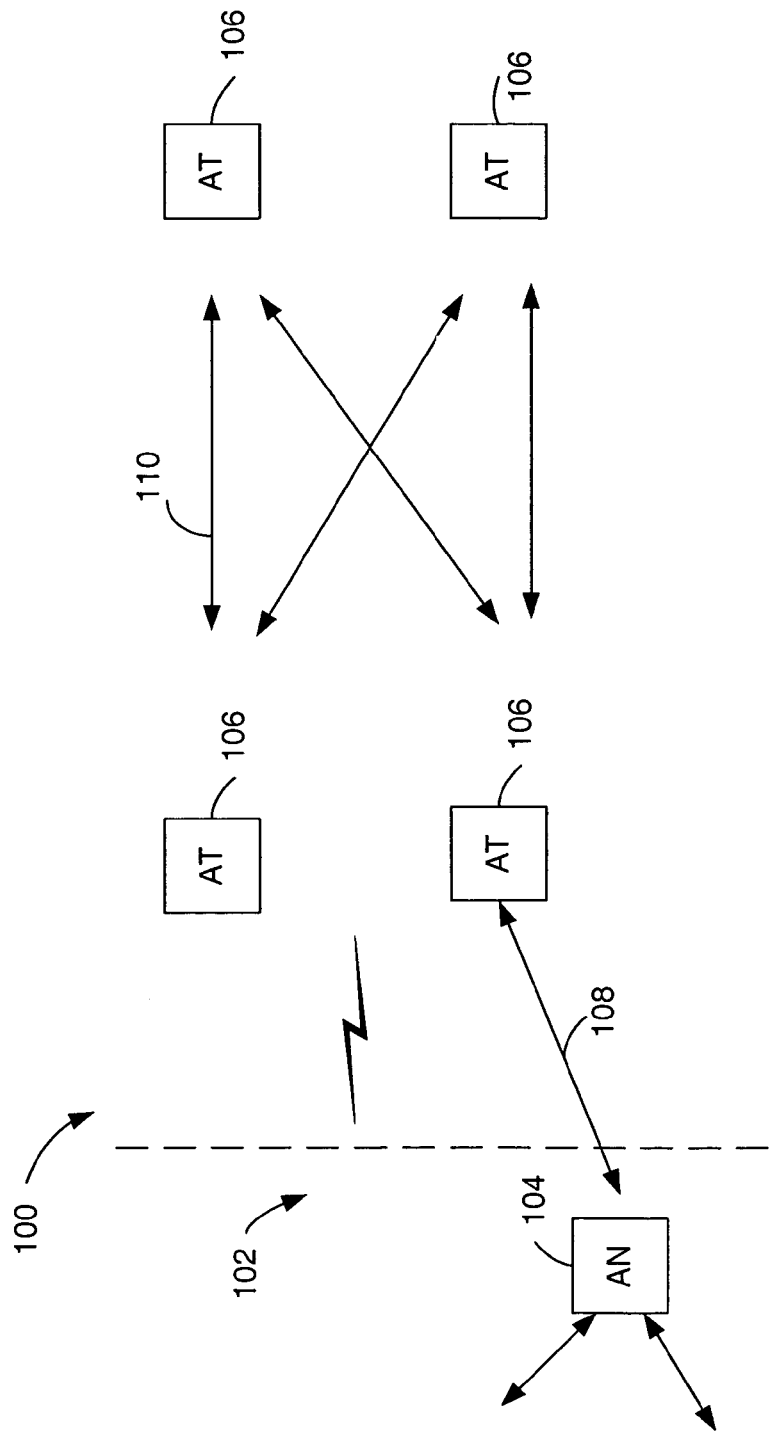
FIG. 1 is a block diagram of a multiple-access system in which access terminals support peer-to-peer communications with other access terminals of the network.

Peer-to-peer communication involves a group of communication entities sharing some common characteristic, or set of characteristics, enabling initiation and communication with each other without the help of higher-level intermediaries.

Peer-to-peer communications may be used for Push-To-Talk (PTT) and other applications, such as Push-To-Media (PTM), (an extension of PTT for data) and extends to media transmissions, such as video.

Existing multiple-access networks with established infrastructure for receiving and serving requests for access to a network are being adapted to provide their users with the capability to conduct peer-to-peer communications among themselves. Network access is provided to access terminals such as mobile phones, computers, personal digital assistants, and other equivalent devices, by point-to-point communications between the terminals and one or more access nodes of a multiple-access network. Such networks have been deployed with protocols and equipment for managing the infrastructure to ensure that the maximum number of terminals have access to the network at or above some minimum threshold level of service quality. It would be convenient and cost-effective if these protocols could be adapted or modified, without extensive redesign and engineering of access terminal and infrastructure architecture, for management of corresponding aspects of peer-to-peer communications among the access terminals.

For example, a wireless cellular communication system provides network access to access terminals in the form of mobile phones, enabling devices to transmit and receive a wide variety of information via communications with the system. The power transmitted by the mobile phones in the system presents a significant problem as the level of power transmitted is to be controlled to maintain the quality of communications throughout the system. In this regard, many phones access the system simultaneously or concurrently, and the aggregate of power transmitted by all the active phones results in interference to the system. Further, as the phones are mobile, communication paths to the system infrastructure constantly vary, requiring adjustment of the transmit power levels to maintain a level of quality in communications. Therefore, access management may involve limiting the level of transmit power of each mobile phone active in the system and adjusting the level as the phone moves within the area of system coverage.

A first power control method, the principle assumes a phone closer to the cellular infrastructure is to transmit to the infrastructure at a lower power level than a phone farther from the infrastructure. Each mobile phone measures the total power received from base components of the infrastructure and sets the transmit power inversely to the level of power received from base components. The direction of phone-to-system transmission is, by convention, the reverse link, and the technique is referred to as "reverse link open-loop power control." (The forward link is in the system-to-phone direction.) The technique is open-loop because it is controlled only by the phone based on the phone's estimate of power received from the base components.

A second reverse link power control method utilizes reverse link transmit power received by base components of the cellular infrastructure from a mobile phone to establish a target power level for that mobile phone. A target power level for the mobile phone is a Power Control (PC) setpoint determined in an outer loop of a power control procedure. This is required to adjust the transmit power of the mobile phone as a function of the channel and, to a lesser degree, as a function of data rate. The infrastructure sends power control signals to the phone on the forward link that cause the phone to adjust reverse link transmit power (up or down) toward the target power level. The technique is called "reverse link closed-loop power control" because it utilizes the loop between the phone and the system infrastructure with participation at both ends. The target power level is a power control setpoint established by an outer loop of the closed loop procedure.

Open and closed-loop power control for multiple-access wireless communication systems are taught, for example, in the following U.S. Pat. Nos. 5,056,109; 5,396,516; 5,933,781; 6,035,209; 6,101,179; 6,609,008; and 6,621,804. Outer loop processing is explained, for example, in the following U.S. Pat. Nos. 6,748,234, 6633,552, and 6,529,482.

With the adaptation of a multiple-access network to provide its access terminals with peer-to-peer capability, in addition to point-to-point capability, the problem of network power control is compounded by the contribution of transmit power in peer-to-peer communications to the total interference experienced by the network.

In one aspect, peer-to-peer communication among the access terminals of a multiple-access network is provided with in-coverage and out-of-coverage modes in licensed or unlicensed bands. In-coverage operation includes peer-to-peer operation within the area of coverage of the network in an active frequency band licensed to the network or in an unlicensed band. Out-of-coverage operation includes peer-to-peer operation out of the area of coverage, within a frequency band licensed to the network, or peer-to-peer operation in the coverage area on an unused frequency band licensed to the network.

In another aspect, the control of power transmitted by the access terminals of a multiple-access network supporting both system access and peer-to-peer communications by the terminals is provided by adaptation of the network's power control protocols for point-to-point communications to accommodate the needs of peer-to-peer operation. This gives a power control capability to peer-communicating access terminals while ensuring their continued participation in an overall network power control scheme, thereby enabling the network to continue delivering required levels of communication quality to all access terminals of the network. Adaptation of access terminal transmit power control also provides the access terminals of the multiple-access network with the ability to switch between peer-to-peer and network access communications with minimum disruption to the operation of the terminals and the multiple-access network.

In yet another aspect, a multiple-access network employing open loop and closed loop reverse link control of power transmitted by access terminals, transmit power of access terminals with point-to-point and peer-to-peer capability is provided while the access terminals are afforded at least three types of peer-to-peer operation: in-coverage peer-to-peer operation and out-of-coverage peer-to-peer operation in both licensed and unlicensed bands.

In FIG. 1, a multiple-access network 100 includes a network infrastructure 102 including one or more Access Nodes (AN) 104, and a plurality of Access Terminals (AT) 106. The access terminals 106 and the infrastructure communicate with point-to-point communications, such as 108. In addition, the access terminals 106 may conduct peer-to-peer communications 110 with each other. In this description, an access terminal 106, which may be mobile or stationary, transmits and receives data packets through one or more access nodes of the multiple-access network 100. The multiple-access network 100 transports data packets between access terminals 106. The network 100 may be connected or coupled to additional networks (not shown) outside the access network, such as enterprise intranets and the Internet, and may transport data packets between any access terminal 106 and such outside networks. An access terminal that has established an active traffic channel connection with one or more access nodes is called an active access terminal, and is said to be in a traffic state. An access terminal that is in the process of establishing an active traffic channel connection with one or more access nodes is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to an access node is called a reverse link. The communication link through which an access node sends signals to an access terminal is called a forward link.

A multiple-access network is exemplified by a multiple-access wireless system operating as a wideband spread spectrum system, with a Code Division-Multiple Access (CDMA) system as an instructive, although not a limiting, illustration of the principles presented herein. The physical and functional architectures of CDMA systems are well-known, and are described only to a level suitable for understanding how power control may be implemented for such a system serving access terminals which are capable of conducting point-to-point communications with the system and peer-to-peer communications with each other.

Figure 2:
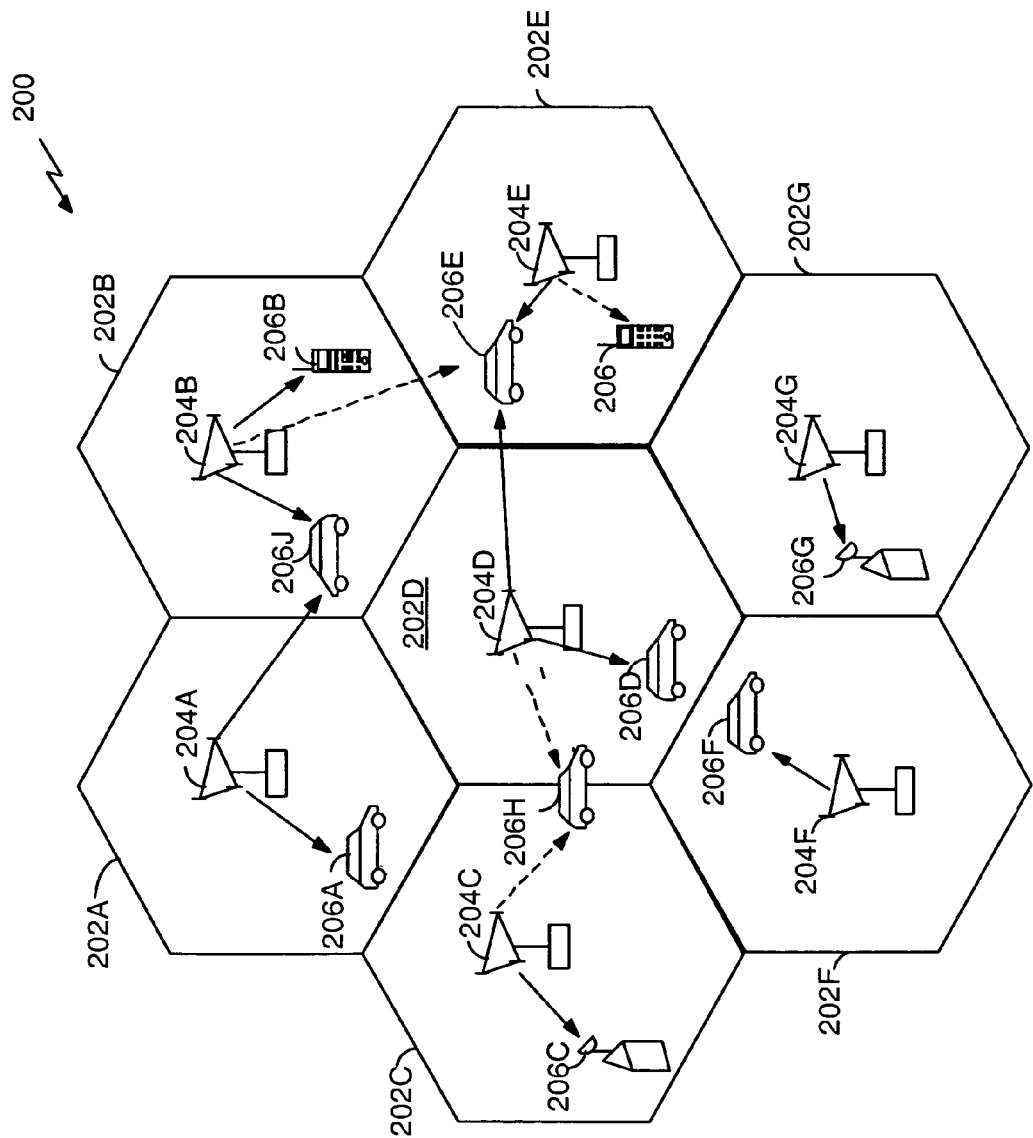
FIG. 2 is a system diagram of an exemplary multiple access network implemented as a Code-Division-Multiple-Access (CDMA) cellular system.

FIG. 2 illustrates a general block diagram of a multiple-access wireless cellular network 200 capable of operating according to any of the CDMA communication system standards, including, without limitation, TIA/EIA-95, TIA/EIA-IS-2000, TIA/EIA/IS-856, IMT-2000, and WCDMA.

Generally, the cellular network 200 of FIG. 2 provides communication for a number of cells 202A through 202G, each including access nodes such as base stations 204A-204G that provide communication links between multiple access terminals 206A-206G, and between the access terminals and one or more other networks (not shown). The base stations are in communication with the access terminals and with each other. A base station communicates with an access terminal through a forward link by way of a forward link signal that sums signals uniquely coded for a number of access terminals. Each access terminal receiving the forward link signal decodes it to extract its uniquely coded signal. Each access terminal communicates with an access node by way of a reverse link signal. See U.S. Pat. No. 6,609,008 for a detailed description of the architecture and operation of a CDMA cellular network.

Peer-to-peer communications by access terminals in a CDMA system may be conducted by bypassing the cellular network, using reverse link operations to transmit to a peer and using forward link operations (reserved for communications from an access node in network operation) to receive system management information from the network. In the peer-to-peer mode, a terminal uses reverse link frequencies exclusively for receiving from and transmitting to its peer terminals. When an access terminal engages in in-coverage peer-to-peer communications using a channel currently being used by other terminals communicating via the network, the access terminal must subject its transmission to network power protocols in order not to degrade the capacity or performance of the network. Thus, the interference that the transmit power of an access terminal when operating in a peer-topeer mode causes the network should be limited to a level no greater than that which it would cause if operating through the network.

Presented herein is a method for peer-to-peer communications which allows an access terminal in the form of a mobile device to receive communications from a peer on a reverse link, which in cellular operation is defined for transmissions from the mobile device. In one embodiment, a mobile device having multiple receive chains, each capable of being tuned to a respective channel, is able to transmit to a peer on a Radio Frequency (RF) channel normally used for the reverse link while at the same time receiving and monitoring corresponding forward link channels. The terminal is able to perform open-loop power control in order to suitably bound its transmit power.

According to one embodiment, the mobile device is a mobile station supporting a spread-spectrum protocol, such as CDMA. The mobile station tunes one receive chain to acquire and track the forward link of the CDMA access network. In so doing the mobile station performs idle station procedures including monitoring for any incoming pages and performing idle handoffs. When the mobile station. begins peer-to-peer operation, it tunes a second receive chain to the appropriate channel to receive other peer-to-peer users (which in this embodiment is a reverse link channel). The peer-to-peer mobile station begins to transmit, but its power must be constrained. The present embodiment may require the mobile station to obey an open loop power control protocol of the access network as a way to limit its transmit power. Of course, a mobile station in peer-to-peer operation may have its transmit power further limited in other ways, such as by direct power control commands for the peer-to-peer counterpart or partner, or by other suitable techniques.

Another objective is to reduce loading on the multiple-access network. By allowing peer-to-peer communications from mobile device to mobile device, without going through a base station or other network infrastructure element, peer-to-peer communication reduces the loading of the network. Network sector loading is also reduced by peer-to-peer use of frequencies other than that used by the network. In these cases, peer-to-peer operation allows wireless communication to continue where it may not be available through the access network.

For in-coverage operation, there is an initial setup through the access network. For purposes of the following discussion, in the exemplary CDMA multiple access network, the mobile device will be referred to as the Access Terminal (AT) and the network will be referred to as the Access Network (AN). These terms are clearly defined for one embodiment in the TIA/EIA/IS-856 standard. As illustrated in FIG. 1, the multiple-access network 100 includes one or more access nodes 104 serving multiple access terminals 106. At some time, the AN 104 determines there is a peer-to-peer mode available for a communication and initiates the setup to transition one of the ATs 106 to peer-to-peer operation. Once the call is set up, the AT 106 receives power control commands for closed-loop power control from the AN 104 as well as from a peer-to-peer partner.

For out-of-coverage and unlicensed band operation, the AT 106 initiates the communication. The AT 106 adapts to perform these functions without coordination through the AN 104.

A goal is to maintain the interference due to terminals in peer-to-peer mode of operation at the same or lower level than the interference from the same terminals in a push-to-media mode of operation.

A further goal is to provide a seamless transition between push-to-media and peer-to-peer modes of operation and vice versa. It is further desired to provide a unified approach for in-coverage and out-of-coverage in licensed and unlicensed bands. Ideally, the coverage scenario and peer-to-peer operation may be provided without visibility to the user.

In one embodiment, a peer-to-peer operation in a multiple-access network is designed to support a large number of users in a group, for example, up to eight users in peer-to-peer mode, and a very large number of users in a broadcast mode. Peer-to-peer operation may be implemented in a variety of modes. For example, in one mode, a predetermined group of ATs 106 are designated as partners to a call. Another mode, may implement a public safety application which is available to police or firefighters. In still another mode, one AT 106 is transmitting to multiple receivers, for example, a video transmission similar to a broadcast transmission.

In-Coverage Operation

In-coverage operation refers to a peer-to-peer communication which takes place in an area currently serviced by an AN 104, using a frequency band currently licensed and in use by the AN 104. In this case, the AT is assisted by the AN 104 in setting up peer-to-peer communication initially, which may result in transitioning a current cellular call to the peer-to-peer mode, and also in power controlling transmissions from the AT 106 during the peer-to-peer call. The AN 104 performs the connection and setup of peer-to-peer communication on occurrence of an event or trigger. Possible triggers may be implemented by the AN 104 based on a variety of considerations, and may include, without limitation: 1) location of the AT 106; 2) the AT 106 moving out of a coverage area; 3) loading of the network 100; 4) proximity of peer-to-peer communication participants; 5) overlap in Active Set (AS) entries for multiple ATs 106; or 6) discretion of the AN 104. The AN 104 then maintains the peer-to-peer communication. The setup and signaling may be identical to that used in CDMA2000 and TIA/EIA/IS-856 High Rate Packet Data (HRPD) networks.

In one scenario, the AN 104 suggests that a group of ATs 106 attempt peer-to-peer mode of operation.

Coding and identification of the AN 104 may provide for dynamic Pseudo-Random-Noise PN long code assignments by the AN 104, for example, when attempting peer-to-peer operation and/or during peer-to-peer operation.

In one embodiment, for peer-to-peer group formation, each AT 106 may maintain a list of ATs 106 designated for peer-to-peer communication. This may be, for example, a group of construction workers that would form a peer-to-peer group. The AT 106 may limit the search to other ATs 106 in pre-formed groups. There may be some common long code masks reserved for ad-hoc peer-to-peer groups. ATs 106 may use common long code masks and request addition to existing peer-to-peer groups. A current group master may be required to search for new peer-to-peer clients. ATs 106 may transmit using common long code masks to establish peer-to-peer groups.

For connection setup and maintenance of a peer-to-peer communication, there is an initial acquisition stage. For peer-to-peer terminal acquisition, the ATs 106 select a best channel for transmission. The AN 104 may provide a usable channel list to the ATs 106. Alternatively, the AN 104 may provide a preferred roaming list of channels with which a terminal may be made aware of peer-to-peer channels in the geographic area once it observes a 1× or DO base station that belongs to that geographical area. The AT 106 may use the base station ID as a key into the preferred roaming list to determine the available peer-to-peer channels in the geographical area. The AN 104 may use a predetermined message format, such as the Universal Neighbor List message described in TIA/EIA/IS-2000, Release A, or the redirect message in TIA/EIA/IS-856.

According to one embodiment, each AT 106 has a channel list to determine an order of transmission during peer-to-peer acquisition. The individual channel list for a given AT 106 is unique to that AT 106. The channel list may be suggested by an AN 104, such as by a Base Station (BS). The channel transmit sequence is then unique to each AT 106 and is known by all other ATs 106 in the peer-to-peer group. The ATs 106 also search for other ATs 106 using the common long code masks.

Each AT 106 will provide an indication to the other AT(s) 106 of the "best" channel for receiving communications. Each AT 106 selects the "best" transmit channel based on feedback, wherein a preferred transmit channel is a most desired channel.

According to another embodiment, two ATs 106 that want to communicate with each other on available channels form a hash value by concatenating their respective IDs. The hash value is input to a hash function whose output is one of a number of frequency channels available for peer-to-peer communication. This enables both ATs 106 to open peer-to-peer communication on the same channel. After initiating peer-to-peer communications on the hashed channel, the ATs 106 can negotiate and move to another channel available for peer-to-peer communication. This method can be extended to more than two ATs 106 by forming the hash value from the IDs of all members of the peer group.

According to another embodiment, each AT 106 measures the receive power on all usable channels and reports the measurements to the AN 104. The AN 104 then suggests the best channels to use for transmit and receive per AT 106, or for the peer-to-peer group. The best channel is specific to the modulation and transmission scenario, such as if the system implements a Time Division Multiplex (TDM) structure or a Code Division Multiplex (CDM) structure as defined hereinbelow. As used herein, a CDM structure provides for simultaneous transmissions to multiple target recipients, wherein the transmissions are code division multiplexed together during one slot. The TDM structure refers to providing different time slots for transmissions to the multiple ATs 106. The channel selection may change as a function of the transmitter, for example as in a CDM structure peer-to-peer session, for an entire peer-to-peer group. The maximum transmit power may be limited by the CDMA network, as discussed hereinbelow with respect to power control.

For peer-to-peer terminal acquisition the received Signal to Interference and Noise Ratio (SINR) measurement (at the AT 106) is performed multiple times over a reasonable time interval to obtain a reliable estimate. Such measurement and estimation may increase the acquisition time.

The channel selection may consider a large channel set, which aids in reducing interference in the network and for the peer-to-peer communication. The large channel set, however, increases the acquisition time. Note, a large number of ATs 106 in a peer-to-peer group further increases the acquisition time.

A system implementing peer-to-peer operation may consider a variety of traffic channel operation options. A first option is for static channel selection to be based on initial acquisition, wherein during initial acquisition the "best" channels are selected. However, such process is time consuming.

A second option provides for channel selection during traffic operation, wherein the ATs 106 continue using the "best" channels or adaptive frequency hopping. A third option uses random frequency hopping since adaptive frequency hopping may not be possible when in traffic state, wherein interference may be averaged over time. In any event, a different option may be used for each modulation/transmission scenario, i.e., TDM or CDM structure.

Figure 3:
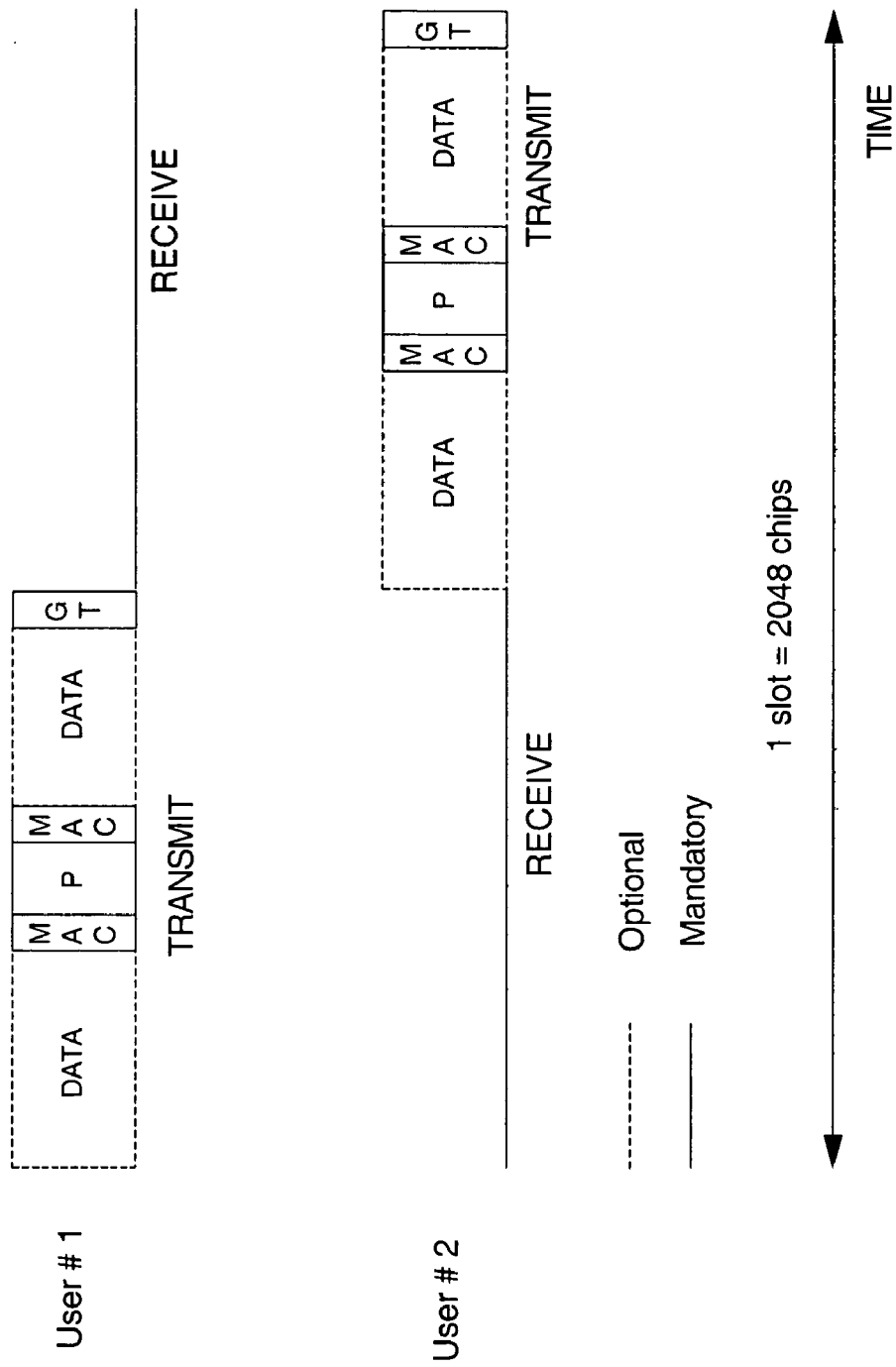
FIG. 3 is a diagram illustrating physical layer protocols for peer-to-peer communications between two access terminals of a multiple-access system.

Refer now to FIG. 3 for an understanding of physical layer protocols for peer-to-peer communication between two ATs 106 (designated User #1 and User #2) according to the principles set forth above. Each peer AT 106 participating in a peer-to-peer communication may be assigned a unique number within a group, e.g., User #1, User #2, etc. Each transmission slot is then divided into at least as many portions as there are participating peers. In some situations, the slot may be divided into more portions than there are participants. The user number corresponds to the slot portion in which that user is to transmit. For the two participant case, User # 1 uses the first half slot to transmit, and receives in the second half slot, and User # 2 uses the second half slot to transmit and the first to receive. A Guard Time (GT) is provided for each transmission to allow time between the transmission and receipt. The GT is used to allow for switch and propagation delays.

The physical layer protocol utilized for peer-to-peer communications between two users which is shown in FIG. 3 may be consistent with TIA/EIA/IS-856, and 1xEV-DO, specifically. In such an embodiment, the Medium Access Control (MAC) channels are used for Reverse Power Control (RPC) and Automatic Repeat Request (ARQ), similar to those defined in 1xEV-DO-Rev A. The resultant transmission structure would be DATA, followed by MAC, followed by Pilot (P), then MAC, then GT. As illustrated in FIG. 3, User #1 transmits during a first portion of the slot, and User #2 transmits during a second portion of the slot.

The two peer protocol illustrated in FIG. 3 may implement peer-to-peer power control as follows, for example. Presume power control commands are in the form of bits. In this regard a power control bit is set to one polarity to command power increases by some predetermined or determinable amount, and to the opposite polarity to command power made up decreases by some predetermined or determinable amount. A transmission frame is made up of sixteen transmission slots. Each frame is subdivided into four sub-frames, each group consisting of four transmission slots. A power control cycle may be completed four times each frame, with one power control bit sent in each sub-frame. Each peer AT measures the received power level of the other peer every slot, averages the received power within the sub-frame, compares the level against a threshold set based upon an outer loop power control set point, and sends a power control bit in at least one designated transmission slot in the following group commanding the other peer to raise (or lower) its transmit power level by some predetermined amount. The power control bit is coded into the two MAC channels of the designated transmission slot or slots. Each peer AT averages the power control bits decoded from the each of the two MAC channels of the designated slot or slots of a group and takes appropriate action with respect to its transmit power level, based upon the averaged power control bit. This example provides the opportunity for at least four transmit power correction actions each frame.

The transmit and receive paths for each AT may use different CDMA channels. One embodiment supports Orthogonal Frequency Division Multiplexing (OFDM) transmissions during the portions designated as DATA parts of the slot if the data rate exceeds a threshold for multi-path mitigation.

Figure 4:
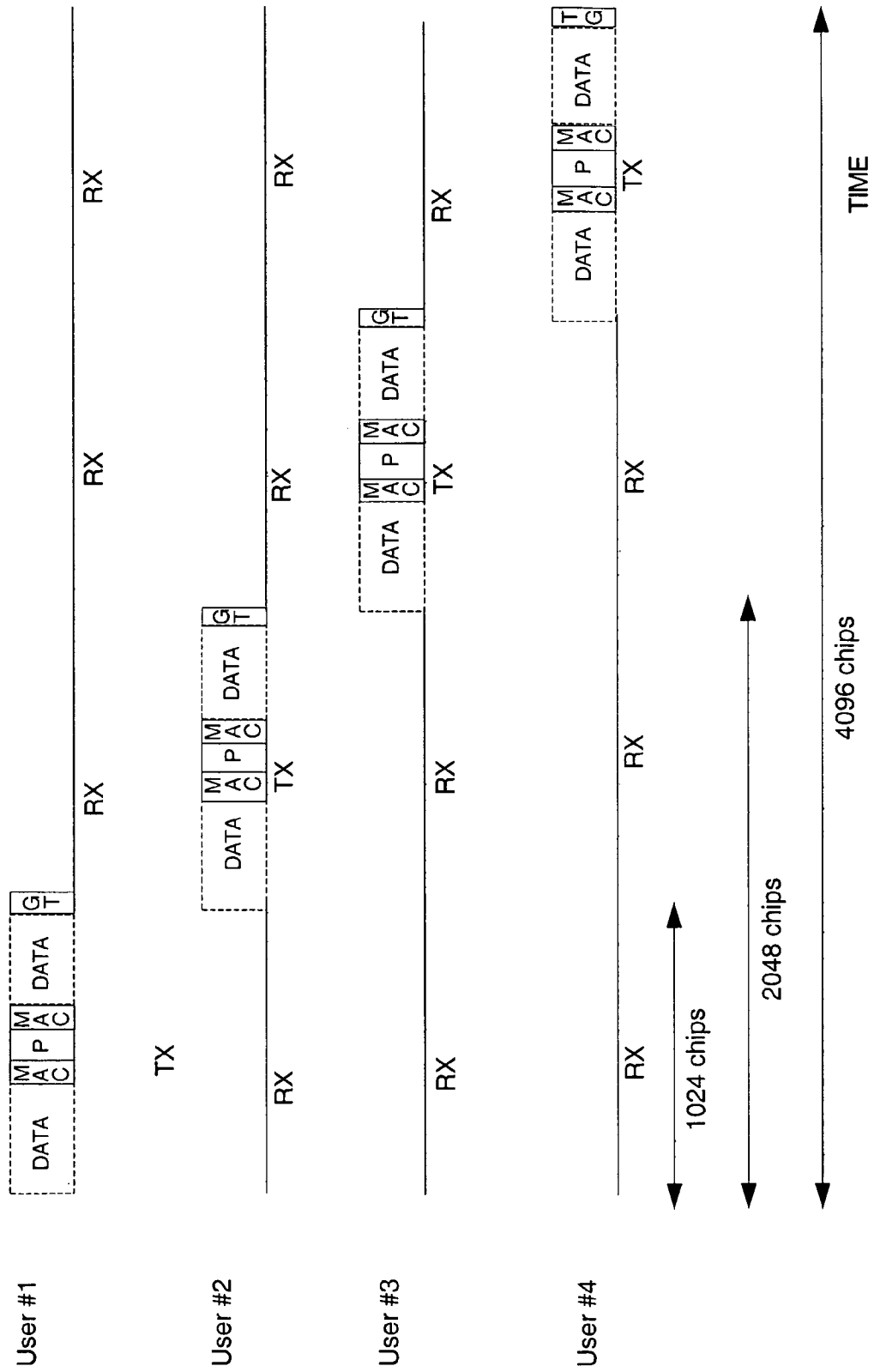
FIG. 4 is a diagram illustrating physical layer protocols for peer-to-peer communications between four access terminals of a multiple-access system.

FIG. 4 illustrates an example with four peer ATs participating in a peer-to-peer communication, peer-to-peer operation uses a TDM structure, wherein the rate of power control is slower than the two participant case by a factor of two. Reference FIG. 2, wherein an AT 206 may communicate with the others via a peer-to-peer session. In this case, each participant sends Power Control (PC) bits to other participants in the peer-to-peer communication. The four participant case may be expanded to more participants, wherein the slot is divided into a greater number of portions to accommodate the new or additional participants. Each increase in the number of participants per slot reduces the PC bit rate. This reduction results in each AT being less responsive to reverse link closed loop power control and may impact performance. One embodiment supports OFDM with partial band transmissions.

For in-coverage operation, each AT in operating in peer-to-peer mode is power controlled by the AN, e.g., each Base Station Transceiver System (BTS) in the AT's active set, as well as all or a portion of the peer-to-peer partner(s). In a more general sense, the access network and other peer ATs may participate in reverse link closed-loop power control of an AT engaged in peer-to-peer communication. In one embodiment, for example, a Channel Element (CE) is assigned to all BTSs in an active set of the AT. A minimum power is required at the BTS receiver to ensure that the fingers continue to stay in-lock at a minimum of with one of the BTSs in the active set. Unlike traditional power control for DS-CDMA systems, such as TIA/EIA/IS-95 and TIA/EIA/IS-2000, the peer-to-peer mode of operation requires two power control set-points. An interference set-point or threshold is selected as a maximum interference power that a BS is willing to accept from a peer-to-peer terminal. This set-point may be the maximum power control set-point determined by the outer loop of the closed-loop power control protocol. A finger set-point or threshold is selected as a minimum received power required to keep lock on a RAKE finger.

Figure 5:
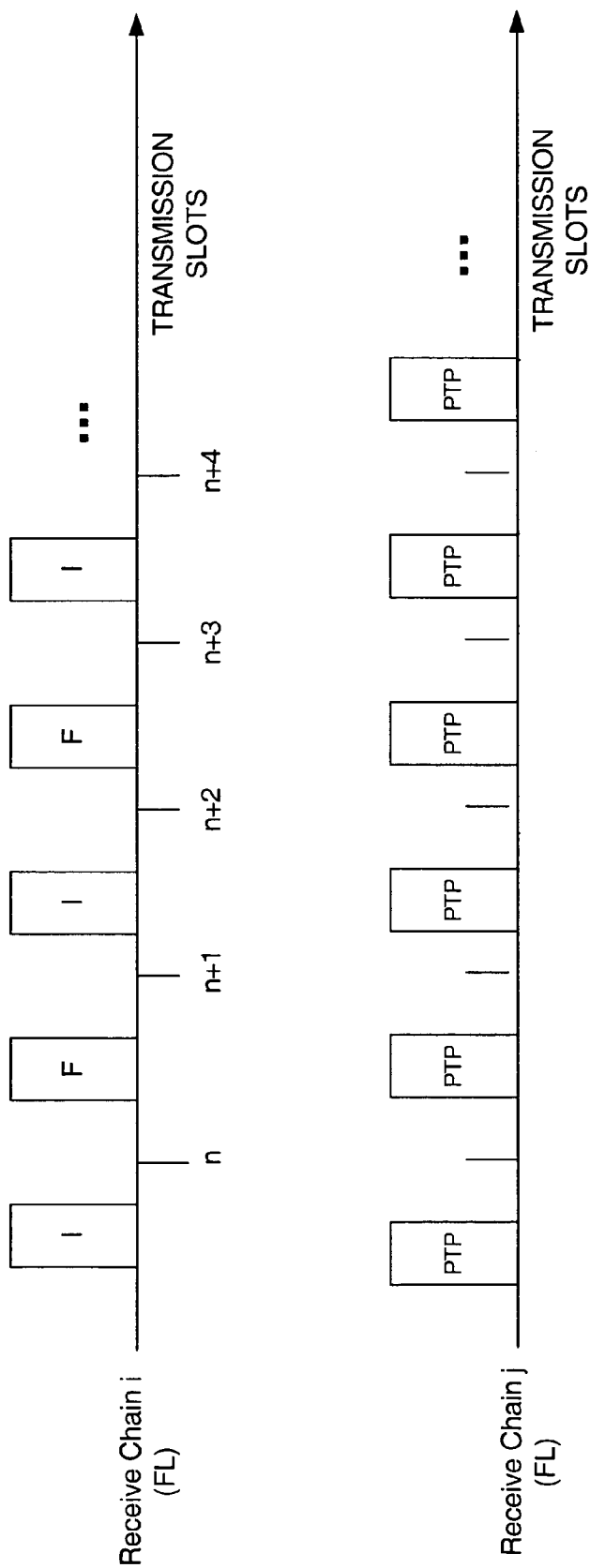
FIG. 5 is a diagram illustrating the use of multiple receive chains to signal power control at the access terminal level.

Refer to FIG. 5 for an understanding of how power control of an AT is signaled at the physical layer. In the figure, Power Control (PC) bits due to the Interference set-point and Finger set-point are transmitted to the AT interlaced on a Forward Link (FL) by at least one AN, each at half the rate of point-to-point closed loop power control. An interference set-point is a threshold above which a mandatory down bit is transmitted from an AN during even slots; a logical high is used if received power at the AN is greater than the interference set-point; a logical low of the mandatory down bit indicates a don't care condition. The finger lock up bit is transmitted during odd slots and is logical low if received power at the AN is less than the finger lock set-point; logical high of the finger lock up bit indicates a don't care condition. Examples of set point calculation are given in U.S. Pat. No. 6,609,008. FIG. 5 illustrates the scheduling for power control bits from an AN on a first receive chain in the AT and from a peer AT on another receive chain. The "I" commands refer to mandatory down commands based on the interference set-point, and transmitted from the AN. The "F" commands refer to power control commands based on the finger set-point, wherein the AN determines the energy needed to receive the signal on all fingers, or at least one finger, at the AN. The PC bits (PTP) from a peer AT are transmitted on a reverse link (RL) during all transmission slots to the AT at the rate of point-to-point closed loop power control. A peer-to-peer power control bit has a logical high value if received power at the peer AT is above a transmission set-point and a logical low value if received power at the peer AT is below the transmission set-point. Of course this bit convention may be inverted, or another convention, using different signaling conventions, may be utilized.

For each set-point, when either bit is needed during a transmission slot in which a new bit is not available, the bit received during the previous slot is used. Specifically, the I bit is transmitted during slot n, and is not transmitted during slot (n+1). During slot n, the AT makes a power control decision in response to the I bit transmitted during that slot. During slot (n+1), the AT makes a power control decision in response to the I bit transmitted during the n slot, as well as in response to the F bit transmitted during slot (n+1). Similarly, during slot (n+2), the AT makes a power control decision in response to the I bit transmitted during the (n+2) slot, as well as in response to the F bit transmitted during slot (n+1).

An AN may provide the AT a delta in measured Ecp/Nt ratio of (Energy per Chip to Thermal Noise) and the Traffic set-point. When the AT transmits data to be decoded by the AN, it has to boost pilot transmit power when transmitting Signaling/Data.

In FIG. 5, the PC bit representation in each transmission slot may contain values for one or more bits, with each bit from a respective source, and all like bits (e.g., all I bits or all F bits) code-division multiplexed. Thus, each BTS in the AT's active set may send an I and an F bit under a respective code, and the AT may receive and decode one or more I bits in even transmission slots, one or more F bits in odd transmission slots. Each peer AT may send a PC bit under a respective code, and one or more PTP bits may be received and decoded in any transmission slot. Thus, closed loop power control for an AT operating in peer-to-peer mode is performed in the following manner. First, all of the power control messages of one type are combined together according to the following rules:

An effective Mandatory Down PC Command is defined to be the OR of all the Mandatory Down PC bits from all BTSs in the active set, i.e., the AT must reduce transmit power when any BTS sends a Mandatory Down;

An Effective Finger Lock Up PC Command is defined to be the AND of all the Finger Lock Up PC bits from all BTSs in the active set, i.e., the AT raises power only if all BS send Finger Lock Up; and An Effective PTP UP PC Command is defined to be the OR of all the Up PC bits from participating peer(s), i.e., the AT would like to raise the power if at least one peer so indicates.

The result of each of these logical operations is an "Effective PC Command." These effective commands are combined by the AT during in-coverage peer-to-peer operation as shown in FIG. 6. The bit values of the power control commands are defined by their names using a mapping of logical value to bit value; here, a logical value of "true" maps to a bit value of "one" and a logical value of "false" maps to a bit value of "zero". For example, the Mandatory Down Command uses a bit value of 1 (true) to indicate a down command, while the Finger Lock Up Command uses a bit value of 0 (false) to indicate a down command. Of course, the PTP Up Command also uses a bit value of 0 (false) to indicate an up command. The Effective Commands are combined to produce the Result illustrated in the right-hand column of the table in FIG. 6. In this column, a "DOWN" result causes the AT to decrease its transmit power level by some predetermined, or determinable, amount, say 1 dB. An "UP" result causes the AT to increase its transmit power level by some predetermined, or determinable, amount, say 1 dB. Although the two cases labeled No Action (N/A) may never occur, the AT is defined to take no action in these two cases.

One embodiment provides a seamless operation for processing communications between ATs using peer-to-peer mode. In a first option, upon instruction from an AN to search for peer-to-peer partner(s) the AT starts operation in gated mode. The transmit duty cycle is a function of the number of peer-to-peer partner(s) if using a TDM structure. The transmitter is assigned the role of an AN when using a CDM structure. The peer-to-peer terminals attempt to acquire partner(s) using the pilot channel transmitted during the gated ON slot.

In a second option, the AT uses other frequency search procedures, such as those used in TIA/EIA/IS-95B. Following detection of pilot, power control bits are sent by the peer-to-peer ATs to partner(s), and a signaling indication sent to the AN as notification of acquisition of the peer-to-peer partner(s).

The peer-to-peer device will need to distinguish the power control bits from the BS and the peer-to-peer partner(s). One embodiment implements an explicit MACID space for such identification. Another embodiment uses power control bits only after a signaling indication from the AN indicating peer-to-peer mode of operation.

Code Division Multiplex (CDM) Structure

Figure 7:
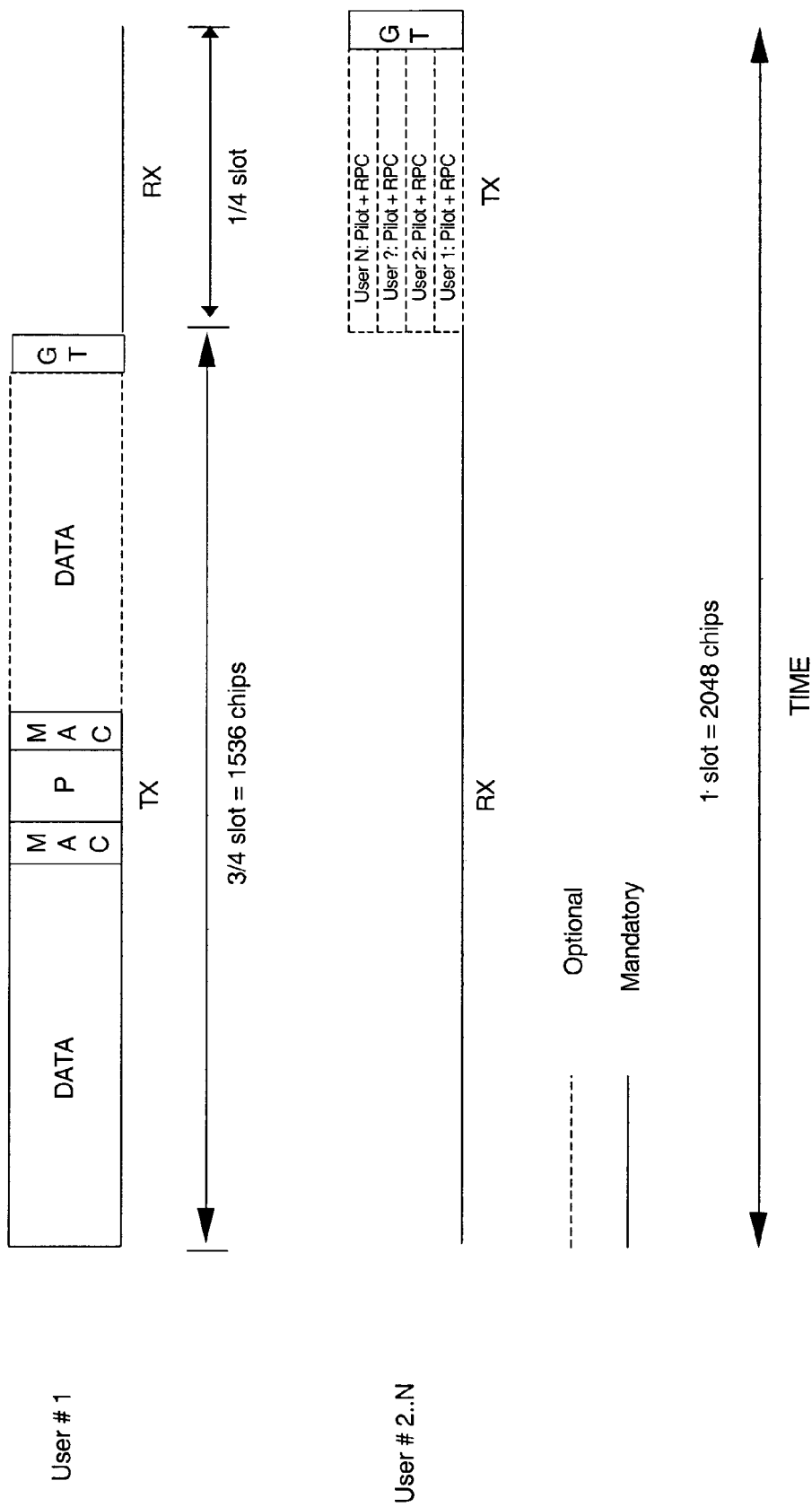
FIG. 7 is a diagram illustrating a CDMA transmission scheme for conducting peer-to-peer communications among access terminals.

Using a CDM structure, one AT transmits to the other ATs which are peer-to-peer partners. The transmitting AT is effectively promoted to perform AN duties. In this way, the transmitting AT receives power control from all of the peer-to-peer partners. The peer-to-peer partners are only receiving from the transmitting AT. FIG. 7 illustrates the transmission scheme. User #1 is the transmitting AT, acting as an AN. User #1 transmits during ¾ of the transmission slot, and receives during ¼ of the transmission slot. The peer-to-peer partners transmit pilot and power control information during ¼ of the transmission slot. The transmission from the peer-to-peer partners are code division multiplexed.

Prior to group establishment, the receiving ATs transmit Pilot and Power Control commands to the transmitting AT. In one embodiment, the peer-to-peer group uses frequency hopping to mitigate interference.

When the transmitting AT changes from User #1 to another partner, User #k, the peer-to-peer group performs a re-establishment procedure.

Time Division Multiplex (TDM) Structure

The TDM structure is illustrated in FIG. 4, wherein each of the participants may transmit during a designated portion of the transmission slot. When the participant transmits, the transmission includes payload (i.e., data), MAC layer signaling information, and a pilot signal, and also allows a Guard Time (GT). The MAC layer signaling includes power control commands.

The TDM structure enables all ATs in a peer-to-peer group to power control others in the peer-to-peer group. The power control of the TDM structure may be enhanced by using an ARQ scheme.

Out-of-Coverage and Unlicensed Band Operation

Operation in an out-of-coverage area or in an unlicensed band is performed without an AN. In this situation, the ATs in a group initiate and maintain the peer-to-peer communication autonomously. It is possible to incorporate minimal changes for out-of-coverage and unlicensed band operation. The start-up is based on common PN long code masks.

As the AN is not involved in this mode of communication, power control is reduced to a decision based on an OR of the Up commands from the peer-to-peer partners. In other words, a given AT will increase transmit power when any one of the partners sends an UP power command.

A coarse timing acquisition is performed and is GPS assisted. For fine timing acquisition, the AT uses the pilot(s) from peer-to-peer partner(s).

Once a peer-to-peer group is identified (and assuming the group ATs have good timing) the position within a transmission slot is known by all others in the group. The ATs are able to determine the timing and which channel will be used for transmission.

The ATs continue searching until a connection is established with at least one other AT, wherein a search for all ATs in the group is performed for a predetermined time interval.

Multiple Receive Chains

Implementation of the embodiments discussed herein may require hardware modifications to present designs for access terminal RF transmit and receive circuits. One approach to redesign may implement a new receive chain so as to maintain multiple receive chains. This provides the required performance, but introduces additional cost and complexity to the hardware.

Figure 8:
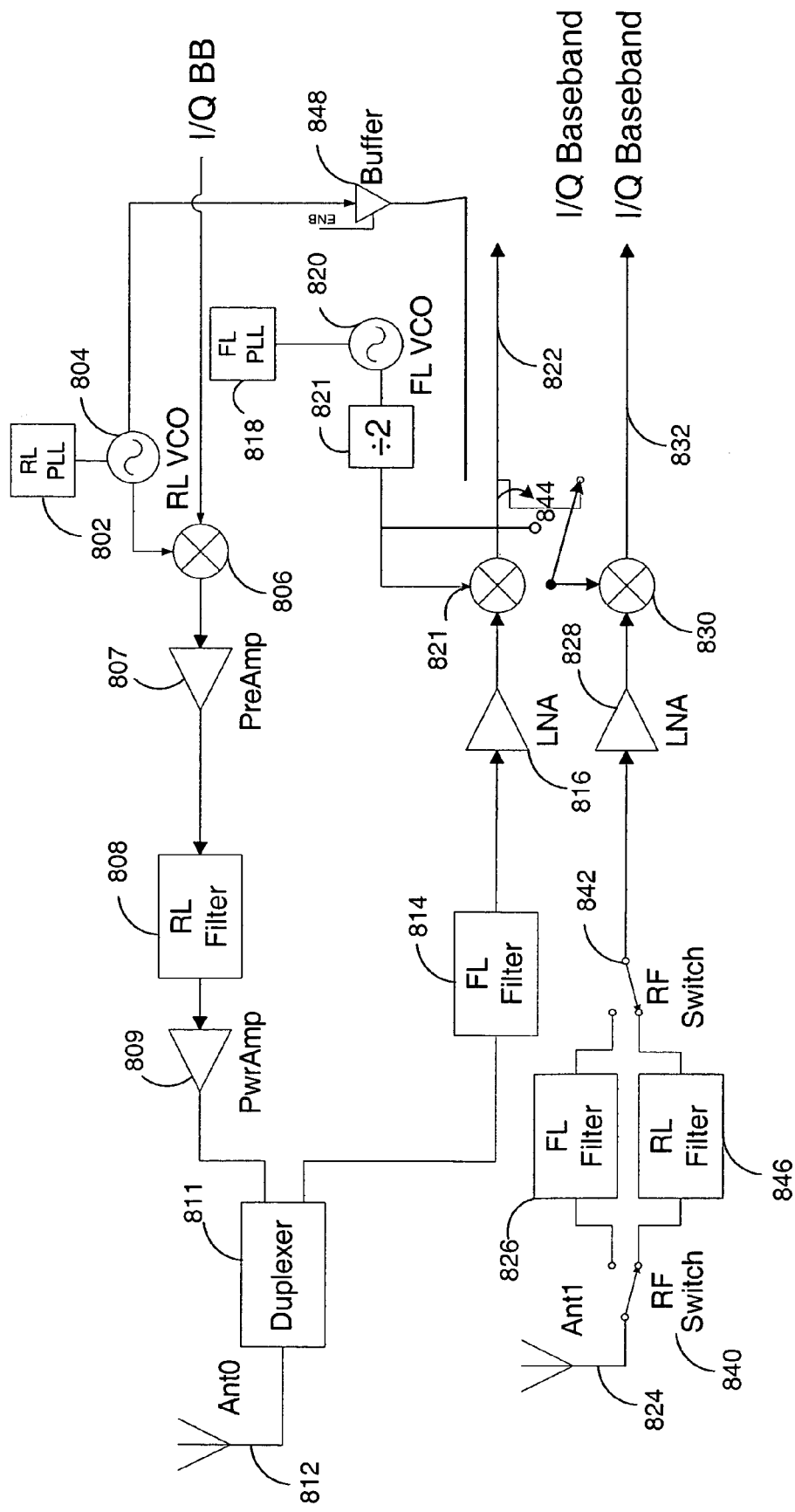
FIG. 8 is a block diagram of the RF section of an access terminal illustrating an embodiment with multiple receive chains.

Another approach introduces RF switches to result in a diversity receiver. The RF switches reduce the cost of hardware modification, but may result in a sensitivity loss. FIG. 8 illustrates one embodiment of the hardware RF portion of an AT with multiple receive chains which facilitates peer-to-peer communication by implementing RF switch(es). In FIG. 8, an I/Q baseband signal (I/Q BB) is transmitted on a reverse link from the access terminal through a transmit chain including a reverse link phase-locked loop (RL PLL) 802 which controls the frequency of a Voltage Controlled Oscillator (VCO) 804. The VCO 804 provides an RL frequency signal, and the RL frequency and I/Q BB signals are mixed in mixer 806. The up-converted signal produced by the mixer 806 is pre-amplified by pre-amplifier 807 and is filtered by a reverse link filter 808, amplified by a power amplifier 809, and fed through a duplexer 811 to a first antenna 812. A forward link signal is received on two receive chains provided for diversity purposes in standard access terminal RF sections. In this regard in a first receive chain a first received signal is provided from the antenna 812 through the duplexer 811 to a forward link (FL) filter 814. The output of the filter 814 is amplified by a Low Noise Amplifier (LNA) 816 and down-converted in a mixer 821 using an FL frequency signal produced by an FL Phase Locked-Loop (FL PLL) 818, a VCO 820 and a divide-by-two circuit 821. A first recovered FL baseband signal is output by the mixer 821 on signal line 822. A second (diversity) receive chain includes an antenna 824 that provides a second received signal to a forward link (FL) filter 826. The output of the filter is amplified by a LNA 828 and down-converted in a mixer 830 using the FL frequency signal produced by the FL phase locked-loop 818, VCO 820 and divide-by-two circuit 821. A second recovered FL baseband signal is output by the mixer 830 on signal line 832. A third receive chain for peer-to-peer communications is provided by way of RF switches 840 and 842, an oscillator switch 844, a Reverse Link (RL) filter 846, and a buffer 848. The RF switch 840 is connected to the output of the antenna 824 and switches the received signal to the FL filter 826 or the RL filter 846. The RF switch 842 is connected to the outputs of the FL filter 826 or the RL filter 846, and switches one of those outputs to the input of the LNA 828. The RL VCO 804 also provides an output to the buffer 848. The oscillator switch 844 receives the FL frequency signal and the RL frequency signal and provides one of those signals to the mixer 830. For receiving forward link communications from access network infrastructure such as an access node, the RF switches 840 and 842 are connected to the FL filter 826 and the oscillator switch 844 connects the FL frequency signal to the mixer 830, with the result that the demodulated FL I/Q baseband signal is from the access network infrastructure. This circuit condition is used for communications between the access terminal and the access network, and may be used, for example, to provide interference and finger lock power control commands to the access terminal. For receiving reverse link communications from peer access terminals, the RF switches 840 and 842 are connected to the RL filter 846 and the oscillator switch 844 connects the RL frequency signal to the mixer 830, with the result that a demodulated RL I/Q baseband signal from one or more peer access terminals is produced. This circuit condition is used for communications between the access terminal and its peers and may be used, for example, to provide PTP power control commands to the access terminal.

Figure 9:
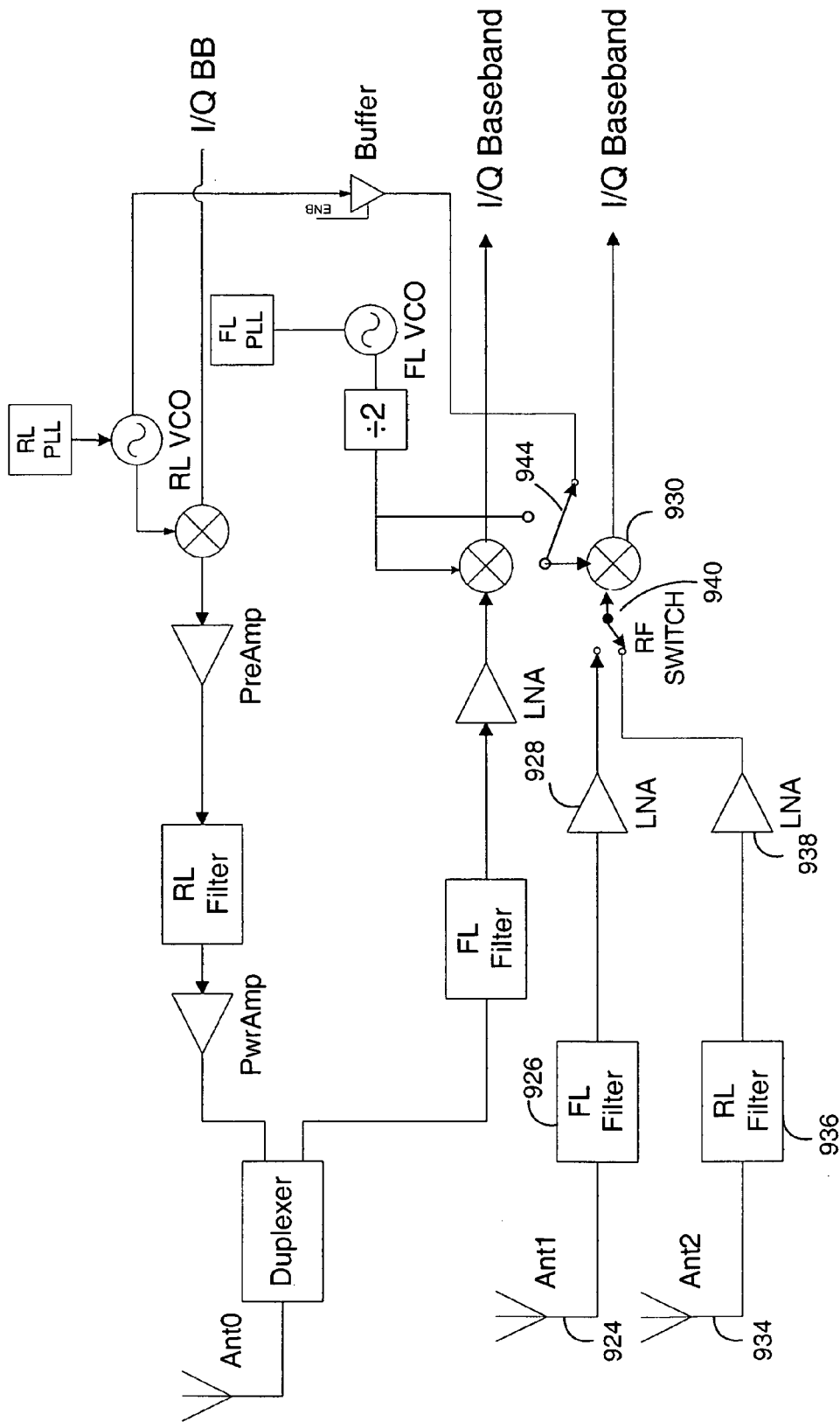
FIG. 9 is a block diagram of the RF section of an access terminal illustrating another embodiment with multiple receive chains.

In still another embodiment, bypass diversity which facilitates peer-to-peer communication is introduced by a receive path LNA in the hardware RF portion of an AT. This is implemented with minimal cost increase but may require an additional antenna. FIG. 9 illustrates this embodiment. In FIG. 9 a multiple receive chain architecture is implemented with at least one RF switch 940. The RF portions of the AT are similar to FIG. 8, with difference in the second and third receive chains. A second (diversity) receive chain includes an antenna 924 that provides a received signal to a forward link (FL) filter 926. The output of the filter 926 is amplified by a LNA 928 and down-converted in a mixer 930 using the FL frequency signal produced as described above in connection with FIG. 8 to produce a demodulated FL I/Q baseband signal. A third receive chain for peer-to-peer communications includes an antenna 934 that provides a received signal to a reverse link (RL) filter 936. The output of the filter is amplified by a LNA 938 and down-converted in the mixer 930 using the RL frequency signal produced as described above in connection with FIG. 8 to produce a demodulated RL I/Q baseband signal. An RF switch 940 has inputs connected to the outputs of the LNAs 928 and 938 and an output connected to one input of the mixer 930. An oscillator switch 944 has inputs that receive the FL and RL frequency signals and an output connected to a second input of the mixer 930. For receiving forward link communications from access network infrastructure such as an access node, the RF switch 940 is connected to the LNA 928 and the oscillator switch 944 connects the FL frequency signal to the mixer 930, with the result that the demodulated FL I/Q baseband signal is from the access network infrastructure. This circuit condition is used for communications between the access terminal and the access network, and may be used, for example, to provide interference and finger lock power control commands to the access terminal. For receiving reverse link communications from peer access terminals, the RF switch 940 is connected to the LNA 938 and the oscillator switch 944 connects the RL frequency signal to the mixer 930, with the result that a demodulated RL I/Q baseband signal from one or more peer access terminals is produced. This circuit condition is used for communications between the access terminal and its peers and may be used, for example, to provide PTP power control commands to the access terminal.

Figure 10:
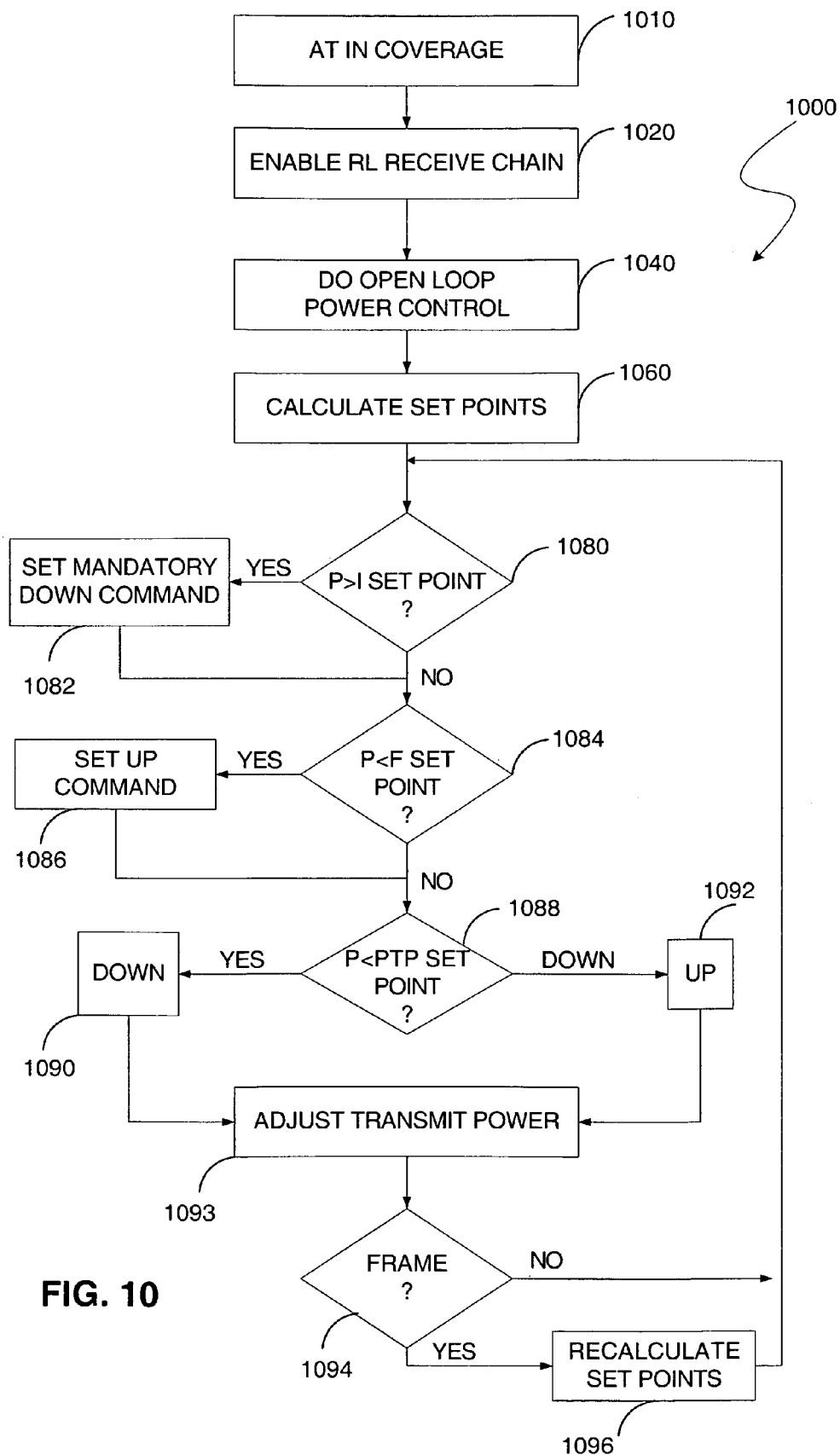
FIG. 10 is a flow diagram illustrating power control for an access terminal during in-coverage operation.

FIG. 10 illustrates a flow diagram 1000 of an exemplary power control method for an in-coverage AT in peer-to-peer mode. Operation of the power control method 1000 begins when the AT begins peer-to-peer operation at 1010. Here, the AT utilizes its first FL receive chain and enables its RL receive chain at 1020. Initially, at 1040, the AT conducts open loop power control based upon the aggregate power received from the multiple-access system and from one or more peer access terminals. Based upon the aggregate power the AT sets its RF transmit power level to a minimum mean power level necessary to elicit a response from the system and transmits a probe. If the attempt fails, the AT increases its power level by some predetermined increment and again transmits a probe.

When the AT receives a system acknowledgement, the method 1000 transitions to closed loop PC at 1060, where the system and the access terminals with which the AT is conducting communications ("peer terminals") calculate respective set points for the power levels used to control the RF transmit power level of the AT. System control is implemented by one or more access nodes. Peer terminals individually control the power of the AT. In one embodiment of the closed loop power control the AT operates in a CDMA cellular system, and its transmit power is controlled by all base transceiver stations in its active set and by the one or more peer terminals with which it communicates. In this case, each base station transceiver calculates interference and finger lock set points for the AT and each peer terminal calculates a peer-to-peer set point for the AT.

The transmit power of the AT is subjected to closed-loop control beginning at 1080 where the one or more base transceiver stations compare the level of power received from the AT against the interference set point value calculated for that AT. If the level exceeds the interference set point value, the mandatory down command (I) is set at 1082. Otherwise, at 1084, the level of power received from the AT is compared against the finger lock set point calculated for that AT. If the level is less than the set point value, the up command (F) is set at 1086. The I and F commands are transmitted to the AT from all access nodes participating in control of the terminal's transmit power in synchronism with the operation of the AT. For example, I and F commands may be transmitted to the AT on a forward link interlaced in alternate transmission slots as disclosed in connection with FIG. 5. Concurrently, at 1088, one or more peer terminals compare the level of power transmitted by the AT against their individually-calculated set points and transmit commands to the AT to either decrease transmit power (1090) or increase transmit power (1092). For example, the peer terminal PTP commands may be transmitted to the AT in every transmission slot on a reverse link designated for peer-to-peer communications for the AT and its partner peer terminals.

At 1093, the AT responds to the I or F and the PTP power control commands received in each transmission slot by adjusting its transmit power level according to a power adjustment mechanization that combines the respective power control commands to yield effective commands and then combines the effective commands to produce a resulting transmit power adjustment action. In this regard, the AT may increase or decrease transmit power by respective predetermined or determinable amounts, or may take no action and leave the transmit power level unchanged. For example, the power control mechanization of FIG. 6 may be used by the AT to decide what adjustment, if any, to make to its transmit power level.

Set points must be continuously recalculated in order to accommodate transmission dynamics. The closed loop power control method includes determination of an interval at 1094 following which recalculation of set points may occur at 1096. Set point recalculation may occur at regular intervals, for example, in response to decoding the contents of a frame (also "packet decoding"). In this regard, upon receipt of an entire sixteen-slot frame, the recipient attempts to decode the frame. If an entire frame has not been received the method returns to 1080 without recalculating set points. Otherwise the set points are recalculated. If the frame decodes incorrectly, a power control set point is increased by some predetermined (or determinable) amount. Otherwise, the set point is reduced by some smaller amount. The set point value is compared, for example, with Ecp/Nt (e.g., signal-to-noise ratio) that is received from the AT.

Figure 11:
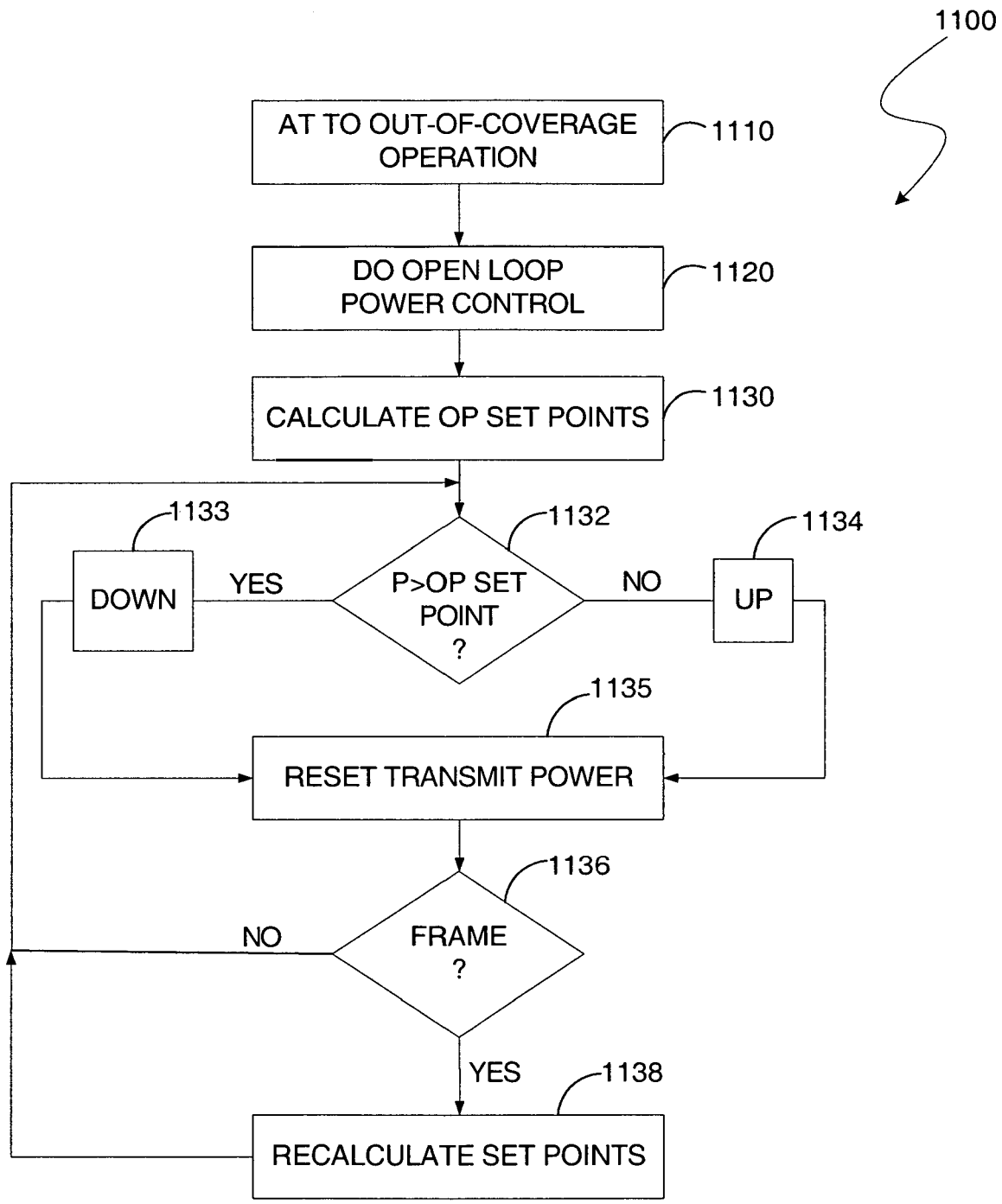
FIG. 11 is a flow diagram illustrating power control for an access terminal during out-of-coverage or unlicensed band operation.

FIG. 11 illustrates a flow diagram 1100 of an exemplary power control method for an out-of-coverage or out-of-band AT in peer-to-peer mode. Operation of the power control method 1100 begins at 1110 with the AT in out-of-band or out-of-coverage status. Each participating AT uses RL receive chain to receive communications from peer terminals. At 1120, an AT begins transmitting on a designated reverse link and conducts open loop power control based upon the aggregate power received from the peer terminals participating in the peer-to-peer communication. Based on the power level received from the transmitting AT, the participating peer terminals calculate PTP set points at 1130 and the method transitions to closed loop power control at 1132. At 1132, one or more peer terminals compare the level of power transmitted by the AT against their individually-calculated set points and transmit commands to the AT to either decrease transmit power (1133) or increase transmit power (1134). For example, the peer terminal PTP commands may be transmitted to the AT in every transmission slot on a reverse link designated for peer-to-peer communications for the AT and its partner peer terminals. At 1135, the AT responds to the PTP power control commands received in each transmission slot by adjusting its transmit power level according to a power adjustment mechanization that combines the PTP power control commands to yield an effective command and then responds to the effective commands by taking a resulting transmit power adjustment action. In this regard, the AT may increase or decrease transmit power by respective predetermined or determinable amounts, or may take no action and leave the transmit power level unchanged.

Set points must be continuously recalculated in order to accommodate transmission dynamics. The closed loop power control method includes determination of an interval at 1136 following which recalculation of set points occurs at 1138. Set point recalculation may occur at regular intervals, for example, in response to the result produced by packet decoding.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Although the invention has been described with reference to various embodiments, examples, and illustrations, it should be understood that modifications can be made without departing from the spirit of the invention. Accordingly, the invention is limited only by the following claims.

What is claimed is:

1. In a multiple-access network, a method of operating an access terminal, comprising:
   receiving peer-to-peer transmission from at least one access terminal on a reverse link of the access network;
   receiving power control commands from the network and from the at least one access terminal; and
   adjusting a transmit power level in response to the power control commands.

2. The method of claim 1, the power control commands from the network including a command for reducing the transmit power level in order to reduce interference caused to the network and a command for increasing the transmit power level in order to maintain a network finger lock.

3. The method of claim 1, the access terminal including multiple receive chains, wherein the act of receiving power control commands includes:
   receiving power control commands from the network on a receive chain tuned to a forward link of the access network; and
   receiving power control commands from the at least one access terminal on a receive chain tuned to the reverse link.

4. The method of claim 3, the power control commands from the network including a command for reducing the transmit power level in order to reduce interference caused to the network and a command for increasing the transmit power level in order to maintain a network finger lock.

5. The method of claim 1, wherein the act of receiving power control commands includes receiving power control commands from the at least one access terminal on the reverse link.

6. The method of claim 1, wherein the act of receiving power control commands includes receiving power control commands from the network on a network forward link.

7. In a code division multiple access wireless communication system, a method of operating a first mobile phone, comprising:
receiving peer-to-peer transmission from at least a second mobile phone on a reverse link of the system;
receiving power control commands from the system and from the second mobile phone; and
adjusting a transmit power level of the first mobile phone in response to the power control commands.

8. The method of claim 7, the power control commands from the system including a command for reducing the transmit power level in order to reduce interference caused to the system and a command for increasing the transmit power level in order to maintain a system finger lock.

9. The method of claim 7, the first mobile phone including multiple receive chains, wherein the act of receiving power control commands includes:
receiving power control commands from the system on a receive chain tuned to a forward link of the system; and
receiving power control commands from the at least a second mobile phone on a receive chain tuned to the reverse link.

10. The method of claim 9, the power control commands from the system including a command for reducing the transmit power level in order to reduce interference caused to the system and a command for increasing the transmit power level in order to maintain a system finger lock.

11. The method of claim 7, wherein the act of receiving power control commands includes receiving power control commands from the at least a second mobile phone on the reverse link.

12. The method of claim 7, wherein the act of receiving power control commands includes receiving power control commands from the system on a system forward link.

13. In a multiple-access network, a method of operating a first access terminal for peer-to-peer communication, comprising:
adjusting a transmit power level of the first access terminal by an open-loop procedure in response to power received from the network and from at least a second access terminal in peer-to-peer communication with the first access terminal;
receiving peer-to-peer transmission from at least the second access terminal on a reverse link of the access network; and
adjusting the transmit power level of the first access terminal by a closed loop in response to power control commands from the system and at least the second access terminal.

14. The method of claim 13, the first access terminal including multiple receive chains, the method further comprising:
receiving communications including power control commands from the network on a receive chain tuned to a forward link of the access network; and
receiving communications including power control commands from the at least one access terminal on a receive chain tuned to the reverse link.

15. The method of claim 14, the power control commands from the network including a command for reducing the transmit power level in order to reduce interference caused to the network and a command for increasing the transmit power level in order to maintain a network finger lock.

16. The method of claim 14, the power control commands from the network including a command for reducing the transmit power level in order to reduce interference caused to the network and a command for increasing the transmit power level in order to maintain a network finger lock.

17. The method of claim 14, further including the act of receiving power control commands from the at least one access terminal on the reverse link.

18. The method of claim 14, further including the act of receiving power control commands from the network on a network forward link.

19. A method of operating a multiple-access network, comprising:
establishing point-to-point communication between the network and an access terminal;
causing the access terminal to receive peer-to-peer transmission;
transmitting power control commands to the access terminal from the network;
transmitting power control commands to the access terminal from at least one other access terminal in peer-to-peer communication with the access terminal; and
adjusting a transmit power level of the access terminal in response to the power control commands from the network and the power control commands from the at least one other access terminal.

20. The method of claim 19, wherein transmitting power control commands to the access terminal from the network includes transmitting the power control commands on a forward link of the network.

21. The method of claim 19, wherein causing the access terminal to receive peer-to-peer transmission includes causing the access terminal to receive peer-to-peer transmission on a reverse link of the network.

22. The method of claim 19, wherein transmitting power control commands to the access terminal from at least one other access terminal includes transmitting the power control commands on a reverse link of the network.

23. A remote station apparatus, comprising:
first means for receiving communications including power control commands on a forward link of a code division multiple access wireless communication system;
second means for receiving peer-to-peer communications including power control commands from at least one other remote station apparatus on a reverse link of the system; and
means for adjusting a transmit power level in response to the power control commands.

24. The remote station apparatus of claim 23, wherein:
the first means include a first receive chain for being tuned to the forward link; and
the second means include a second receive chain for being tuned to the reverse link.

25. An access terminal for peer-to-peer communications in a multiple access system, comprising:
a transmit chain for transmitting communications on a reverse link of the system;
a first receive chain for receiving communications on a forward link of the system; and
a second receive chain for receiving peer-to-peer communications on a reverse link of the system, wherein a transmit power level is adjusted in response to the received communications.

26. The access terminal of claim 25 wherein the second receive chain includes a forward link diversity receive section, a reverse link receive section, a demodulation section and at least one switch for connecting either the forward link diversity receive section or the reverse link receive section to the demodulation section.

27. The access terminal of claim 26 further including:
a first antenna;
a duplexer connecting the transmit chain and the first receive chain to the first antenna;
a second antenna; and
the at least one switch including a first switch for connecting either the forward link diversity receive section or the reverse link receive section to the demodulation section and a second switch, co-operative with the first switch, for connecting either the forward link diversity receive section or the reverse link receive section to the second antenna.

28. The access terminal of claim 26 further including:
a first antenna;
a duplexer connecting the transmit chain and the first receive chain to the first antenna;
a second antenna connected to the forward link diversity receive section;
a third antenna connected to the reverse link receive section; and
the at least one switch including a switch for connecting either the forward link diversity receive section or the reverse link receive section to the demodulation section.

29. In a multiple-access network, a method of operating an access terminal, comprising:
receiving network management transmissions from the access network on a forward link of the access network;
receiving peer-to-peer transmission from at least one access terminal on a reverse link of the access network; and
providing peer-to-peer transmission to the at least one access terminal on the reverse link.

30. The method of claim 29, wherein:
receiving network management transmissions includes receiving power control commands from the network; and
receiving peer-to-peer transmissions includes receiving power control commands and data from the at least one access terminal; and 31. The method of claim 30, further including adjusting a transmit power level of the access terminal in response to the power control commands.

32. A method of operating an access terminal for peer-to-peer communication in n a multiple-access network, comprising:
transmitting peer-to-peer communications to at least one peer access terminal on a reverse link of the multiple-access network; and
receiving peer-to-peer communications from at least one peer access terminal on the reverse link of the multiple-access network, wherein transmitting and receiving occur in a transmission slot of the reverse link.

33. The method of claim 32, wherein the access terminal is a first peer access terminal of N peer access terminals, where N ≧2, and the transmission slot is partitioned into N portions, the method further including:
the first peer access terminal transmitting peer-to-peer communications during a first portion of the transmission slot; and
the first peer access terminal receiving peer-to-peer communications from a second peer access terminal during at least a second portion of the transmission slots.

34. The method of claim 32, wherein the access terminal is a first peer access terminal of N peer access terminals, where N ≧2, and the transmission slot is partitioned into first and second portions, the method further including:
assigning access code division codes to each of the remaining N−1 peer access terminals;
the first peer access terminal transmitting peer-to-peer communications during the first portion of the transmission slot; and
the first peer access terminal receiving peer-to-peer communications from a second peer access terminal during the second of the transmission slots on a code assigned to the second peer access terminal.

35. The method of claim 34, wherein the first portion is ¾ of the transmission slot and the second portion is ¼ of the transmission slot.

36. The method as in claim 32, further comprising:
receiving a usable channel list; and
selecting a channel for transmission.

37. The method as in claim 32, further comprising:
receiving a preferred roaming list of channels; and
determining availability of a peer-to-peer channel.

38. The method as in claim 37, wherein determining availability of a peer-to-peer channel, comprises:
determining availability of the peer-to-peer channels using a base station identifier (ID).

39. The method as in claim 32, further comprising:
forming a hash value by concatenating identifiers (IDs) of each peer access terminal;
performing a hash function to output a number of frequency channels availability for peer-to-peer communication.

40. The method as in claim 39, further comprising:
negotiating among the peer access terminals to move to another channel available for peer-to-peer communication.

41. The method as in claim 40, wherein forming the hash value comprises: forming the hash value by concatenating IDs of all members of a peer group.

42. A remote station apparatus, comprising:
first means for transmitting peer-to-peer communications to at least one peer access terminal on a reverse link of the multiple-access network;
second means for receiving peer-to-peer communications from at least one peer access terminal on the reverse link of the multiple-access network;
means for receiving a usable channel list; and
means for selecting a channel for transmission.

43. The apparatus as in claim 42, further comprising:
means for receiving a preferred roaming list of channels; and
means for determining availability of a peer-to-peer channel.

44. The method as in claim 42, farther comprising:
means for forming a hash value by concatenating identifiers (IDs) of each peer access terminal;
means for performing a hash function to output a number of frequency channels available for peer-to-peer communication.

45. The method as in claim 44, further comprising:
means for negotiating among the peer access terminals to move to another channel available for peer-to-peer communication.

46. The method as in claim 45, wherein means for forming the hash value comprises:
means for forming the hash value by concatenating IDs of all members of a peer group.

* * * * *